(12) United States Patent
Kim et al.

(10) Patent No.: US 11,095,169 B2
(45) Date of Patent: Aug. 17, 2021

(54) SWIPT SIGNAL RECEIVER AND SWIPT SIGNAL RECEIVING METHOD

(71) Applicant: Research & Business Foundation Sungkyunkwan University, Suwon-si (KR)

(72) Inventors: Dong In Kim, Seongnam-si (KR); Jong Ho Moon, Busan (KR); Jong Jin Park, Suwon-si (KR); Kang Yoon Lee, Seoul (KR)

(73) Assignee: Research and Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 16/691,785

(22) Filed: Nov. 22, 2019

(65) Prior Publication Data

US 2020/0195062 A1 Jun. 18, 2020

(30) Foreign Application Priority Data

Dec. 17, 2018 (KR) .......................... 10-2018-0163403

(51) Int. Cl.
*H02J 50/20* (2016.01)
*H01Q 1/24* (2006.01)
(Continued)

(52) U.S. Cl.
CPC .............. *H02J 50/80* (2016.02); *H02J 50/27* (2016.02)

(58) Field of Classification Search
CPC .......... H02J 50/27; H02J 50/001; H02J 50/80; H02J 1/10; H02J 1/084; H02J 7/025;
(Continued)

(56) References Cited

U.S. PATENT DOCUMENTS 10,111,024 B2 * 10/2018 Chae .................... H04W 52/383
10,236,726 B2 * 3/2019 Khan ....................... H02J 50/80
(Continued)

FOREIGN PATENT DOCUMENTS

KR 10-1710012 B1 2/2017
KR 10-1829625000 B1 2/2018
(Continued)

OTHER PUBLICATIONS

Ju, Hyungsik et al., "A Novel Mode Switching Scheme Utilizing Random Beamforming for Opportunistic Energy Harvesting", *IEEE Transactions on Wireless Communications*, vol. 13, Issue: 4, Jul. 21, 2014 (pp. 1-36).
(Continued)

*Primary Examiner* — Pablo N Tran
(74) *Attorney, Agent, or Firm* — NSIP Law

(57) ABSTRACT

A receiver that receives a simultaneous wireless information and power transfer (SWIPT) signal is provided. The receiver comprises an antenna configured to receive a SWIPT signal including a power signal and an information signal; an energy harvester configured to receive the SWIPT signal from the antenna when a communication mode is an energy harvesting (EH) mode; and an information decoder configured to receive the SWIPT signal from the antenna when the communication mode is an information decoding (ID) mode.

10 Claims, 3 Drawing Sheets

(51) Int. Cl.
  *H01Q 1/52*    (2006.01)
  *H02J 50/00*   (2016.01)
  *H04L 12/24*   (2006.01)
  *H04L 1/00*    (2006.01)
  *H02J 50/80*   (2016.01)
  *H02J 50/27*   (2016.01)

(58) Field of Classification Search
  CPC ..... H02J 50/40; H04B 5/0037; H04B 5/0031; H04W 4/70; H02M 7/06
  See application file for complete search history.

(56) References Cited

U.S. PATENT DOCUMENTS

| | | | |
|---|---|---|---|
| 10,361,596 B1* | 7/2019 | Al-Habob | H02J 50/40 |
| 10,411,764 B2* | 9/2019 | Lee | H04B 5/0037 |
| 10,541,567 B2* | 1/2020 | Kim | H02J 50/40 |
| 10,708,102 B2* | 7/2020 | Kim | H04L 27/2614 |
| 2020/0106308 A1* | 4/2020 | Kim | H02J 50/80 |

FOREIGN PATENT DOCUMENTS

| | | |
|---|---|---|
| KR | 10-1869224000 B1 | 6/2018 |
| KR | 10-1863237000 B1 | 7/2018 |

OTHER PUBLICATIONS

Korean Office Action dated Oct. 30, 2019 in counterpart Korean Patent Application No. 10-2018-0163403 (6 pages in Korean).
Korean Office Action dated May 28, 2020 in counterpart Korean Patent Application No. 10-2018-0163403 (2 pages in Korean).

\* cited by examiner

SWIPT SIGNAL RECEIVER AND SWIPT SIGNAL RECEIVING METHOD

CROSS-REFERENCE TO RELATED APPLICATIONS

This application claims the benefit under 35 U.S.C. 119(a) of Korean Patent Application No. 10-2018-0163403 filed on Dec. 17, 2018, in the Korean Intellectual Property Office, the disclosure of which is incorporated herein by reference for all purposes.

BACKGROUND

1. Field

The following description relates to a simultaneous wireless information and power transfer (SWIPT) signal receiver, and a SWIPT signal receiving method.

2. Description of Related Art

A typical energy harvester including a single energy harvesting circuit may have a limited range in which power conversion efficiency (PCE) is favorable. When received power is low due to a turn-on voltage of a diode. When the received power is high, a saturation region is generated due to a reverse breakdown voltage of the diode, and thereby the PCE is decreased. Accordingly, it may be difficult to apply the typical energy harvester for simultaneous wireless information and power transfer (SWIPT) to simultaneously transmit or receive information and power with the received power in a wide range.

Additionally, an energy harvester intended for harvesting energy from a radio frequency (RF) signal includes a rectifier that receives power, rectifies the voltage, and outputs the rectified voltage at a desired direct current (DC) level, a DC-DC converter, and a capacitor or a battery storing the rectified DC.

A commonly used energy harvesting circuit has nonlinearity. As illustrated in FIGS. 1A and 1B, it may be understood that the energy harvesting circuit has favorable power conversion efficiency in a limited range.

As illustrated in FIG. 1A, when input power is low, it may be difficult to operate the energy harvesting circuit due to the turn-on voltage of the diode, and thereby output power is low.

As illustrated in FIG. 1B, when the input power is high, a saturation region is generated due to the reverse breakdown voltage of the diode, and thereby power conversion efficiency is decreased.

Additionally, it may not be beneficial that the reverse breakdown voltage is applied to the diode of the rectifier, because the circuit can be broken. Therefore, there is a problem in that input power can be used only at a level lower than a level in the saturation region.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a receiver includes an antenna configured to receive a simultaneous wireless information and power transfer (SWIPT) signal, an energy harvester configured to receive the SWIPT signal from the antenna, when a communication mode is an energy harvesting (EH) mode, and an information decoder configured to receive the SWIPT signal from the antenna, when the communication mode is an information decoding (ID) mode.

The SWIPT signal may include a power signal and an information signal.

The energy harvester may include N energy harvesting circuits connected in parallel, a controller configured to reconfigure the N energy harvesting circuits to activate a first number of the N energy harvesting circuits ($\hat{N}$), and a battery configured to store energy harvested from the energy harvesting circuits.

In the reconfiguring of the N energy harvesting circuits, the controller may be configured to select the first number of activated energy harvesting circuits based on a magnitude of the power signal included in the SWIPT signal.

A saturation region of the N energy harvesting circuits may be controlled by increasing or decreasing the first number of activated energy harvesting circuits.

The energy harvester may be configured to compute energy harvested from the first number of activated energy harvesting circuits among the N energy harvesting circuits, based on the following expression:

$$Q_{tot}(\alpha, \hat{N}, P_r) = \alpha f(Q_i(\rho_i P_r), \hat{N}) \text{ s.t. } \sum_{i=1}^{\hat{N}} \rho_i P_r = P_r,$$

where ($\hat{N}$) is the first number of activated energy harvesting circuits, $Q_i(\rho_i P_r)$ is energy harvested from an i-th activated energy harvesting circuit, and $\rho_i P_r$ is power inputted to the i-th energy harvesting circuit.

The receiver may be configured to select the ID mode as the communication mode when $R(\alpha_v=0, P_{r,v}) \geq \lambda [Q_{tot}(\alpha_v=1, \hat{N}_v^*, P_{r,v})]$, and select the EH mode as the communication mode when where $R(\alpha_v=0, P_{r,v}) < \lambda [Q_{tot}(\alpha_v=1, \hat{N}_v^*, P_{r,v})]$, where $R(\alpha_v, P_{r,v})$ is total harvested energy, $Q_{tot}$ is total harvested energy, $P_{r,v}$ received power, $\overline{Q}$ is minimum energy in each block required for self-powering, and $Q_{tot}(\alpha_v=1, \hat{N}_v^*, P_{r,v})$ is energy obtained by harvesting the received power ($P_{r,v}$) in a v-th block through $\hat{N}_v^*$ circuits.

If a self-powering condition in the receiver is not satisfied, a data transmission rate is lowered by extending an area in the EH mode by increasing $\lambda$, and if the self-powering condition in the receiver is satisfied, the data transmission rate is increased by reducing the area in the EH mode by decreasing $\lambda$.

In a general aspect, a simultaneous wireless information and power transfer (SWIPT) signal system includes a transmitter configured to generate the SWIPT signal, a transmitter antenna, configured to transmit the generated SWIPT signal, a receiver antenna configured to receive the SWIPT signal, a receiver configured to operate in one of an energy harvesting (EH) communication mode, and an information decoding (ID) communication mode based on the received SWIPT signal, the receiver comprising, an information decoder; and an energy harvester including a controller, N energy harvesting circuits connected in parallel; and a battery, configured to store energy received in the SWIPT signal, wherein the energy harvester is configured to receive the SWIPT signal from the receiver antenna when a communication mode is the EH communication mode; and the information decoder is configured to receive the SWIPT signal from the receiver antenna when the communication mode is the ID communication mode.

The SWIPT signal may include a power signal and an information signal.

The controller may be configured to control a saturation state of the N energy harvesting circuits by activating a first number of energy harvesting circuits of the N energy harvesting circuits.

The first number of activated energy harvesting circuits may be increased or decreased based on a magnitude of a power signal included in the SWIPT signal.

In a general aspect, a method includes receiving a simultaneous wireless information and power transfer (SWIPT) signal in a receiver, determining a communication mode of the receiver, receiving the SWIPT signal in an energy harvester when the communication mode is determined to be an energy harvesting (EH) mode; and receiving the SWIPT signal in an information decoder when the communication mode is determined to be an information decoding (ID) mode.

Other features and aspects will be apparent from the following detailed description, the drawings, and the claims.

Figure 1A:
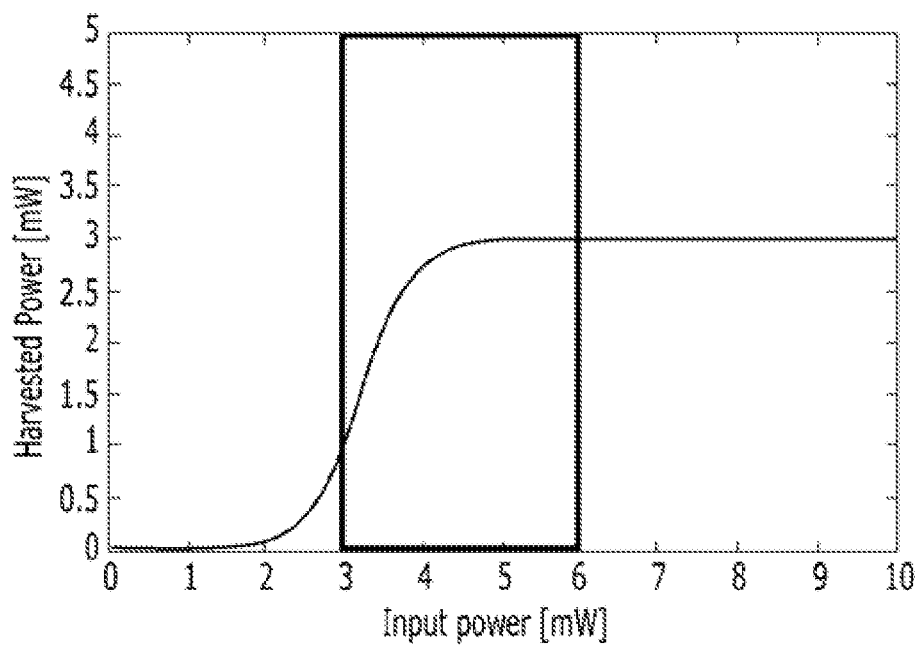
FIGS. 1A and 1B are graphs illustrating that a typical energy harvesting circuit has favorable power conversion efficiency in a limited range.
Figure 1B:
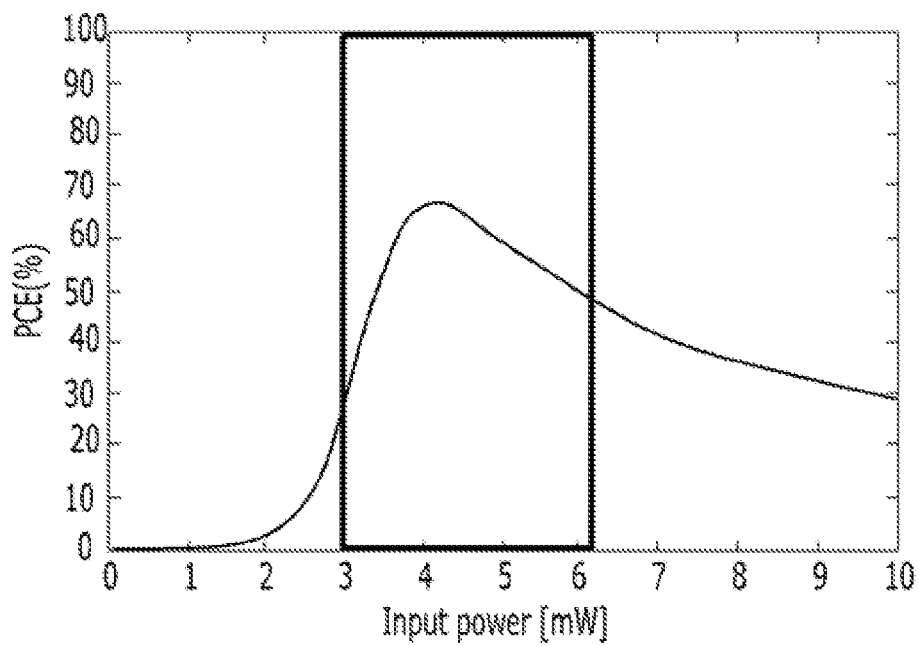

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples When a certain element is referred to as being "coupled" or "connected" to another element, although the certain element may be directly coupled or connected to the other element, it should be understood that another intervening element may exist therebetween. On the other hand, when a certain element is referred to as being "directly coupled" or "directly connected" to another element, it should be understood that no intervening element exists therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Throughout the specification and claims, when it is described that a certain part includes a certain element, this implies the inclusion of other elements rather than the exclusion of any other elements, unless explicitly described to the contrary.

A receiver that receives a simultaneous wireless information and power transfer (SWIPT) signal is provided in which multiple energy harvesting circuits are connected in a parallel structure, and power is distributed such that different power is inputted to each of the energy harvesting circuits according to received power, thereby enabling each of the energy harvesting circuits to have optimal power conversion efficiency (PCE).

Since information and energy are transmitted or received together in one signal, an appropriate change in mode according to reception environments may be desired between energy harvesting (EH) and information decoding (ID). Accordingly, the examples provide a receiver which receives a SWIPT signal, that enables the reconfigurable energy harvester to select an optimal mode at all times in a SWIPT environment where information and energy are simultaneously transmitted or received, thereby improving energy harvesting efficiency, and adjusts an EH/ID mode-selected area based on average received power, thereby implementing a self-powering receiver.

The receiver that receives a SWIPT signal may include an antenna that receives a SWIPT signal including power (signal) and information (signal), an energy harvester that receives the SWIPT signal from the antenna when a communication mode is an energy harvesting (EH) mode, and an information decoder that receives the SWIPT signal from the antenna when the communication mode is an information decoding (ID) mode.

The energy harvester may include N energy harvesting circuits connected in parallel, a controller reconfiguring the N energy harvesting circuits to activate only some energy harvesting circuits ($\hat{N}$), and a battery storing energy harvested from the energy harvesting circuits. The controller may change the number of activated energy harvesting circuits for reconfiguration according to a magnitude of the power included in the SWIPT signal to prevent each of the energy harvesting circuits from reaching a saturation region.

In the receiver that receives a SWIPT signal according to the examples, if it is difficult to satisfy a self-powering condition, an area in the EH mode may be extended by increasing λ, thereby lowering a data transmission rate. If the self-powering condition is satisfied, the area in the EH mode is reduced by decreasing λ, thereby raising the data transmission rate.

Hereinafter, examples will be described in detail with reference to the accompanying drawings.

The examples relate to a reconfigurable receiver that receives a SWIPT signal including N energy harvesting circuits configured in parallel. The examples also relate to a receiver that receives a SWIPT signal, and configures energy harvesting circuits in a reconfigurable structure by adjusting the number of energy harvesting circuits activated for optimal energy harvesting efficiency according to received power.

The receiver according to the examples may employ a structure in which a plurality of reconfigurable energy harvesting circuits is configured in parallel. Therefore, it is possible to support a wide range of input power that is required for SWIPT.

Additionally, the receiver may adjust each of the energy harvesting circuits such that power inputted thereto is within a range with optimal PCE, thereby preventing a saturation region. Therefore, overall PCE may be improved.

The receiver may reconfigure the energy harvester according to a magnitude of the received power such that overall energy harvesting efficiency is maximum. Therefore, the input power may be used in a wider range.

The receiver may adjust an EH/ID mode-selected area and the number of activated energy harvesting circuits based on a proposed algorithm while monitoring reception environments. Therefore, self-powering may be ensured, and an optimal transmission rate ($R(\alpha_v, P_{r,v})$) may be achieved.

Figure 2A:
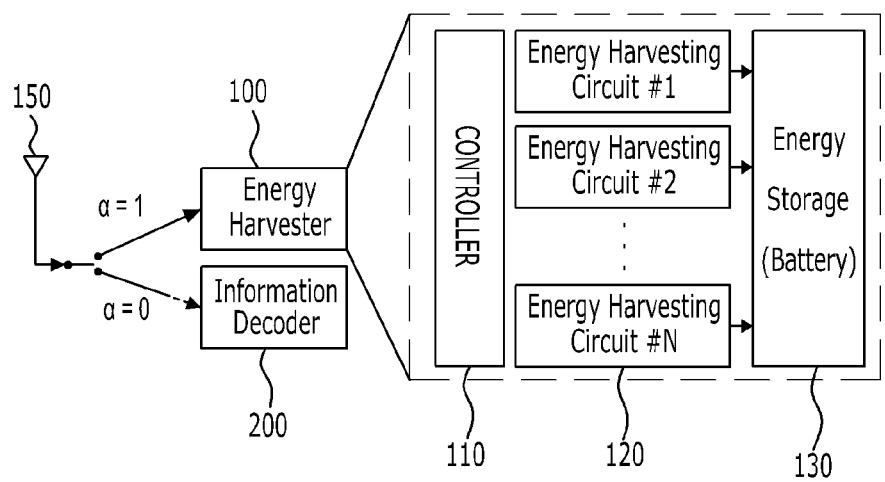
FIG. 2A is a block diagram of an example of a receiver that receives a simultaneous wireless information and power transfer (SWIPT) signal in accordance with one or more embodiments.

FIG. 2A illustrates an example of a block diagram of a receiver that is configured to receive a simultaneous wireless information and power transfer (SWIPT) signal in accordance with one or more embodiments.

Figure 2B:
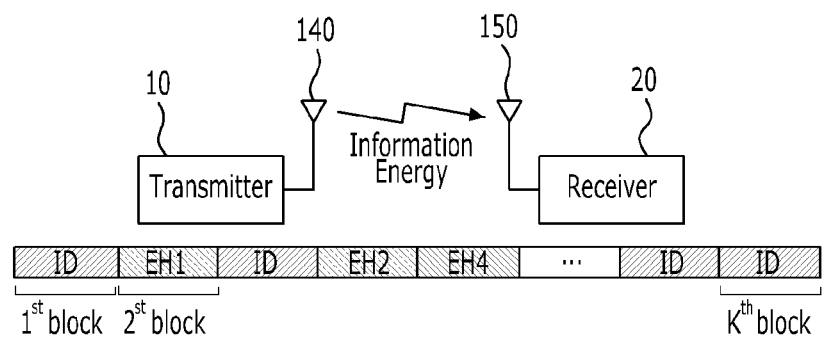
FIG. 2B illustrates an example of the transmission of a SWIPT signal between a transmitter and a receiver, in accordance with one or more embodiments.

FIG. 2B illustrates an example of a system for simultaneously transmitting information and energy from a transmitter 10 to a receiver 20 that receives a SWIPT signal. The transmitter to may include an antenna 140 configured to transmit the SWIPT signal, and the receiver 20 may include an antenna 150 configured to receive the transmitted SWIPT signal.

Referring to FIG. 2A, the receiver 20 that receives a SWIPT signal according to an example may include an energy harvester 100 and an information decoder 200.

The energy harvester 100 may include a controller 110, N energy harvesting circuits 120 configured in parallel, and a battery 130.

The controller 110 may reconfigure the N energy harvesting circuits 120 to activate only $\hat{N}$ circuits.

For example, in order to prevent each energy harvesting circuit 120 from reaching a saturation region when received power is large, the controller 110 of the energy harvester 100 may reduce power inputted to each energy harvesting circuit 120 by increasing the number of activated energy harvesting circuits 120. In other words, the controller 110 may activate a subset of the plurality of energy harvesting circuits.

Thus, the number of activated energy harvesting circuits 120 is proportional to a magnitude of the received power.

The receiver that receives a SWIPT signal according to an example may operate in one communication mode during one channel block, and the received SWIPT signal may be fed to the energy harvester 100 or the information decoder 200 according to the communication mode. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

A received SWIPT signal (r[v]) of a v-th block may be represented by Expression 1 below.

$$r[v]=\sqrt{P}hx[v]+n[v] \quad \text{Expression 1}$$

In Expression 1, $\sqrt{P}x[v]$ is a transmitted SWIPT signal, h is a channel gain, and n[v] is a received noise.

As illustrated in FIG. 2A, when α=0 where the communication mode is an information decoding (ID) mode, all of the received SWIPT signals are fed to the information decoder 200.

Alternatively, when α=1 where the communication mode is an energy harvesting (EH) mode, the received SWIPT signal is fed to the energy harvester 100 and used to harvest energy.

When the communication mode is the EH mode, the energy harvester 100 distributes the power of the received SWIPT signal to the activated energy harvesting circuits 120.

Energy harvested from the energy harvesting circuits 120 is stored in the battery 130 which is an energy storage element.

When $\hat{N}$ energy harvesting circuits among the N energy harvesting circuits 120 are activated through the reconfiguration of the energy harvester 100, harvested energy is represented by Expression 2 below.

Expression 2:

$$Q_{tot}(\alpha, \hat{N}, P_r) = \alpha f(Q_i(\rho_i P_r), \hat{N}) \text{ s.t. } \sum_{i=1}^{\hat{N}} \rho_i P_r = P_r$$

In Expression 2, $Q_i(\rho_i P_r)$ is energy harvested from an i-th activated energy harvesting circuit 120, and $\rho_i P_r$ is power inputted to the i-th energy harvesting circuit (120).

The total power inputted to multiple activated energy harvesting circuits 120 is equal to the received power.

As seen from Expression 2 above, the total harvested energy is affected by the number of activated energy harvesting circuits 120 and energy harvested from the activated energy harvesting circuits 120.

When $\alpha=1$, the energy harvester 100 may harvest energy to a maximum level through reconfiguration. The total harvested energy ($Q^*_{tot}$) is represented by Expression 3 below.

$$Q^*_{tot}(\hat{N}, P_r) = \max_\rho [f(Q(P_r)), f(Q(\rho_1 P_r), Q(\rho_2 P_r)), \ldots f(q(\rho_1 P_r), \ldots, Q(\rho_N P_r))] \quad \text{Expression 3}$$

In Expression 3, $\rho = [\rho_1, \ldots, \rho_N]$ is a vector of a power distribution proportion for each of multiple energy harvesting circuits 120.

In an example of an ideal energy harvester 100 in which there is no loss in the energy conversion process, and the energy harvesting circuits 120 have the same power conversion efficiency (PCE), the total energy harvested from the energy harvester 100 to the maximum is represented by Expression 4 below.

$$Q^*_{tot}(\hat{N}, P_r) = \hat{N} Q(P_r/\hat{N}) \quad \text{Expression 4}$$

In Expression 4, the number $\hat{N}$ of circuits activated for reconfiguration and the optimal power distribution proportion $\rho^*_i$ are represented by Expression 5 below.

$$\hat{N} = \arg\max_N \{Q(P_r), \ldots, N Q(P_r/N)\}$$

$$\rho^*_i = 1/\hat{N}, i \in \{1, \ldots, \hat{N}\} \quad \text{Expression 5}$$

As another example, a SWIPT signal receiving method in accordance with one or more embodiments will be described below.

In the SWIPT signal receiving method according to an example, the receiver that receives a SWIPT signal may continuously monitor received power ($P_{r,v}$) average received power ($\bar{P}_r$), and total harvested energy ($Q_{tot}$), and based thereon, adjust the communication mode, and reconfigure the energy harvester 100.

By adjusting the communication mode and reconfiguring the energy harvesting circuits 120 as described above, the receiver that receives a SWIPT signal according to an example, may ensure self-powering in response to a change in the surrounding reception environments and at the same time may achieve an optimum transmission rate ($R(\alpha_v, P_{r,v})$).

In the examples, the transmission rate may be obtained through the Shannon capacity formula based on Expression 6 below, but may vary depending on a modulation technique in an actual situation.

$$R(\alpha_v, P_{r,v}) = (1-\alpha_v) \log_2(1 + P_v/\sigma^2) \quad \text{Expression 6}$$

In Expression 6, $\sigma^2$ is received noise power.

The receiver that receives a SWIPT signal according to an example may satisfy the average harvested energy condition for self-powering that is represented by Expression 7 below.

$$E_v[Q_{tot}(\alpha_v, \hat{N}_v, P_{r,v})] \geq \bar{Q} \quad \text{Expression 7}$$

In Expression 7, $E_v[\cdot]$ denotes an average concerning v, $Q_{tot}(\alpha_v, \hat{N}_v, P_{r,v})$ denotes energy obtained by harvesting the received power ($P_{r,v}$) in the v-th block through $\hat{N}_v$ circuits, and $\bar{Q}$ denotes minimum energy in each block necessary for self-powering.

The optimization problem of adjusting the communication mode and reconfiguring the energy harvester 100 such that the self-powering condition is satisfied, and the data transmission rate is maximal is represented by Expression 8 below.

$$(P1): \max_{\alpha, N} E_v[R(\alpha_v, P_{r,v})] \text{ s.t. } E_v[Q_{tot}(\alpha_v, \hat{N}_v, P_{r,v})] \geq \bar{Q} \quad \text{Expression 8}$$

Expression 8 may be changed into the Lagrange dual problem represented by Expression 9 below.

$$(P2): \min_{\lambda \geq 0} g(\lambda) \quad \text{Expression 9}$$

In Expression 9, $g(\lambda)$ may be represented by Expression 10 below.

$$g(\lambda) = \max_{\alpha, N} E_v[R(\alpha_v, P_{r,v})] + \lambda(E_v[Q_{tot}(\alpha_v, \hat{N}_v, P_{r,v})] - \bar{Q}) \quad \text{Expression 10}$$

In Expression 10, $\alpha$ and $\hat{N}$ are vector forms of $\alpha_v$ and $\hat{N}_v$, respectively.

The receiver that receives a SWIPT signal according to an example, may compute Expression 9 and select the ID mode or the EH mode for the communication mode according to given received power ($P_{r,v}$) as shown in Expression 11 below.

Selecting ID Mode $$R(\alpha_v=0, P_{r,v}) \geq \lambda[Q_{tot}(\alpha_v=1, \hat{N}^*_v, P_{r,v})]$$

Selecting EH Mode $$R(\alpha_v=0, P_{r,v}) < \lambda[Q_{tot}(\alpha_v=1, \hat{N}^*_v, P_{r,v})] \quad \text{Expression 11}$$

With Expression 11, the received power of the receiver may be divided into an EH mode-selected area and an ID mode-selected area.

The EH mode-selected area is represented by Expression 12 below.

$$P_{EH} = \{P_{r,v} | R(\alpha_v=0, P_{r,v}) < \lambda[Q^*_{tot}(\alpha_v=1, \hat{N}_v, P_{r,v})]\} \quad \text{Expression 12}$$

In Expression 12, $\lambda$ has one value within a given window size (W) and may satisfy the condition: $E_v[Q_{tot}(\alpha_v, \hat{N}^*_v, P_{r,v})] = \bar{Q}$.

Figure 3:
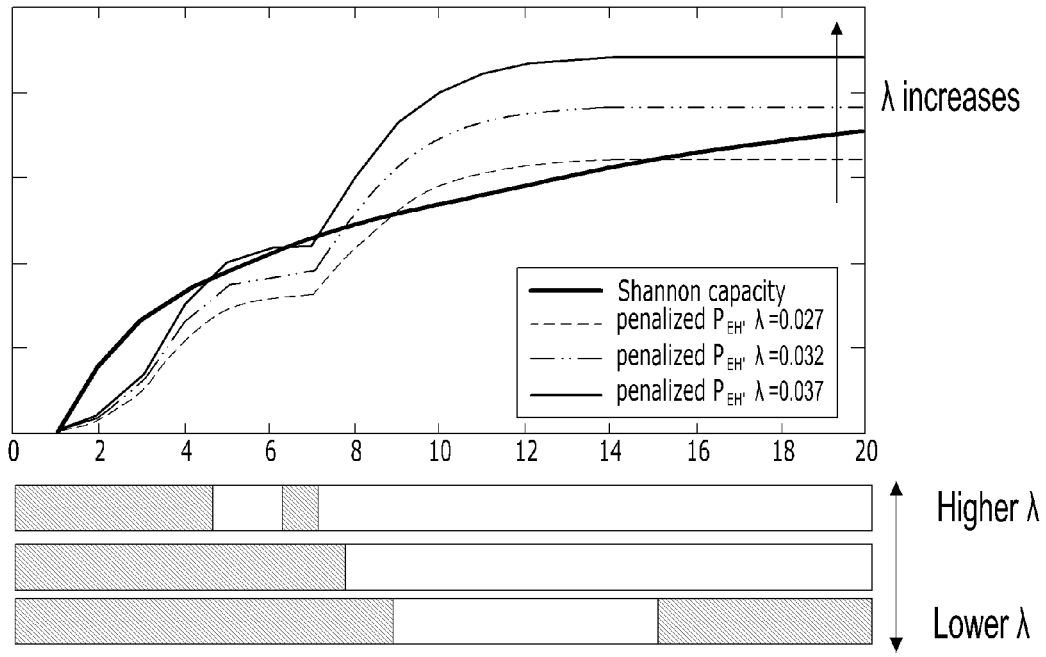
FIG. 3 is a graph illustrating an example of a relationship between an EH mode-selected area and λ in the receiver that receives a SWIPT signal according to the present disclosure.

That is, in the examples, $\lambda$ is an important variable affecting selection of the EH or the ID mode. The relationship between the EH mode-selected area and $\lambda$ may be seen from FIG. 3.

$\lambda$ may satisfy the self-powering condition, which may be affected by the received power and the consumed power of the circuit.

For example, when the average received power is low or the consumed power of the circuit is large, $\lambda$ is large and the EH mode-selected area is wide.

That is, if it is difficult to satisfy the self-powering condition, the area in the EH mode is extended by increasing $\lambda$. On the other hand, if the self-powering condition is sufficiently satisfied, the area in the EH mode is reduced by decreasing $\lambda$, thereby raising a transmission rate.

Figure 4:
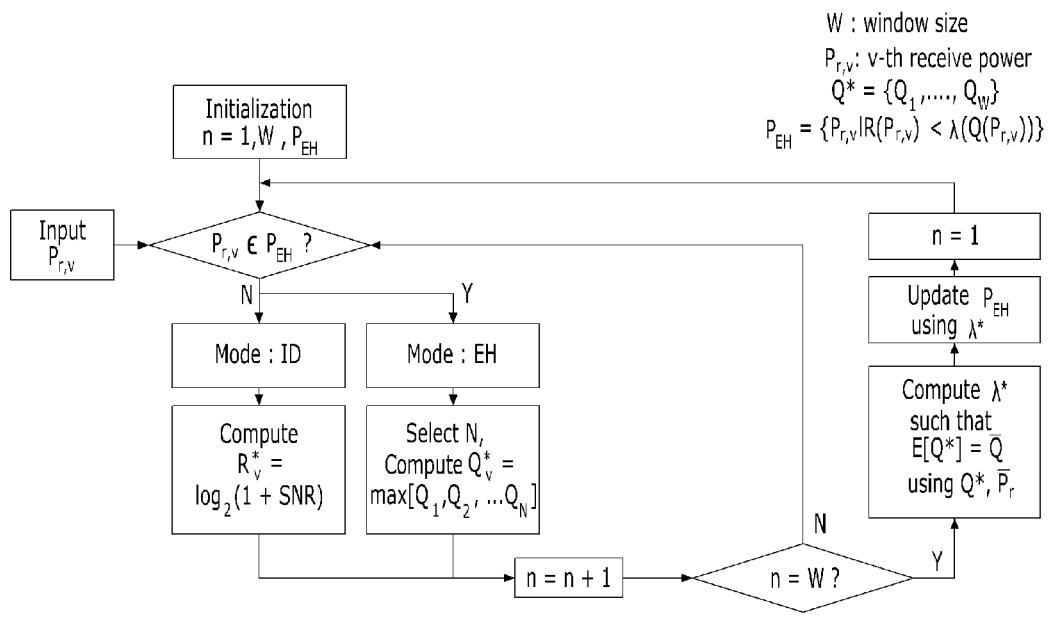
FIG. 4 is an example of a diagram of an algorithm for a SWIPT signal receiving method in accordance with one or more embodiments.

The algorithm for the SWIPT signal receiving method according to examples is as illustrated in FIG. 4.

As illustrated in FIG. 4, the algorithm for the SWIPT signal receiving method may be largely composed of two loops, i.e. an outer loop and an inner loop.

The inner loop may operate on a short-term basis, and the outer loop may operate on a long-term basis for each given window size (W).

More specifically, the receiver that receives a SWIPT signal according to the examples may receive received power ($P_{r,v}$) and select a communication mode.

When the received power ($P_{r,v}$) is for an EH mode area ($P_{r,v} \in P_{EH}$), the EH mode is selected as a communication mode. Otherwise, the ID mode is selected.

In an example, when the EH mode is selected in the receiver, the energy harvester 100 is reconfigured to activate an optimal mode of energy harvesting circuits 120.

The outer loop may update λ based on the average received power during the window size and the energy harvested during the inner loop. According to the updated λ, the EH mode-selected area or the ID mode-selected area may be changed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A receiver comprising:
an antenna configured to receive a simultaneous wireless information and power transfer (SWIPT) signal;
an energy harvester comprising energy harvesting circuits, the energy harvester configured to receive the SWIPT signal from the antenna when a communication mode is an energy harvesting (EH) mode; and
an information decoder configured to receive the SWIPT signal from the antenna, when the communication mode is an information decoding (ID) mode,
wherein the energy harvester is further configured to monitor a received power, an average received power, a total harvested energy, adjust the communication mode, and activate each of the energy harvesting circuits based on the received power, the average received power and the total harvested energy.

2. The receiver according to claim 1, wherein the SWIPT signal comprises a power signal and an information signal.

3. The receiver according to claim 1, wherein the energy harvester further comprises:
N energy harvesting circuits connected in parallel;
a controller configured to reconfigure the N energy harvesting circuits to activate a first number of the N energy harvesting circuits ($\hat{N}$); and
a battery configured to store energy harvested from the energy harvesting circuits.

4. The receiver according to claim 2, wherein in the reconfiguring of the N energy harvesting circuits, the controller is configured to select the first number of activated energy harvesting circuits based on a magnitude of the power signal included in the SWIPT signal.

5. The receiver according to claim 4, wherein a saturation region of the N energy harvesting circuits is controlled by increasing or decreasing the first number of activated energy harvesting circuits.

6. The receiver according to claim 4, wherein the energy harvester is configured to compute energy harvested from the first number of activated energy harvesting circuits among the N energy harvesting circuits, based on the following expression:

$$Q_{tot}(\alpha, \hat{N}, P_r) = \alpha f(Q_i(\rho_i P_r), \hat{N}) \text{ s.t. } \sum_{i=1}^{\hat{N}} \rho_i P_r = P_r,$$

where ($\hat{N}$) is the first number of activated energy harvesting circuits, $Q_i(\rho_i P_r)$ is energy harvested from an i-th activated energy harvesting circuit, and $\rho_i P_r$ is power inputted to the i-th energy harvesting circuit.

7. The receiver according to claim 6, wherein the receiver is further configured to:
select the ID mode as the communication mode when
$R(\alpha_v=0, P_{r,v}) \geq \lambda[Q_{tot}(\alpha_v=1, \hat{N}_v^*, P_{r,v})]$, and
select the EH mode as the communication mode when
$R(\alpha_v=0, P_{r,v}) < \lambda[Q_{tot}(\alpha_v=1, \hat{N}_v^*, P_{r,v})]$,
where $R(\alpha_v, P_{r,v})$ is a transmission rate,
$Q_{tot}$ is total harvested energy,
$P_{r,v}$ is received power,
$\overline{Q}$ is minimum energy in each block required for self-powering, and
$Q_{tot}(\alpha_v=1, \hat{N}_v^*, P_{r,v})$ is energy obtained by harvesting the received power ($P_{r,v}$) in a v-th block through $\hat{N}_v^*$ circuits.

8. The receiver according to claim 7, wherein if a self-powering condition in the receiver is not satisfied, a data transmission rate is lowered by extending an area in the EH mode by increasing λ, and
if the self-powering condition in the receiver is satisfied, the data transmission rate is increased by reducing the area in the EH mode by decreasing λ.

9. A method comprising:
receiving a simultaneous wireless information and power transfer (SWIPT) signal in a receiver;
determining a communication mode of the receiver;
receiving the SWIPT signal in an energy harvester when the communication mode is determined to be an energy harvesting (EH) mode; and
receiving the SWIPT signal in an information decoder when the communication mode is determined to be an information decoding (ID) mode,
wherein the energy harvester comprises energy harvesting circuits, and
wherein the energy harvester is further configured to monitor a received power, an average received power, a total harvested energy, adjust the communication mode, and activate each of the energy harvesting circuits based on the received power, the average received power and the total harvested energy.

10. The receiver according to claim 1, wherein the antenna is configured to receive the SWIPT signal from a transmitter.

* * * * *